United States Patent [19]

Cunard et al.

[11] 4,387,070

[45] Jun. 7, 1983

[54] METHOD FOR MAKING A WHEEL WITH AN INTEGRAL TIRE

[75] Inventors: Joel C. Cunard; William H. Ziegler, Jr., both of Bedford, Pa.

[73] Assignee: Brown Group Recreational Products, Inc., Bedford, Pa.

[21] Appl. No.: 227,158

[22] Filed: Jan. 22, 1981

[51] Int. Cl.³ .......................... B29C 5/00; B29D 3/00; B29H 3/08
[52] U.S. Cl. ................................. 264/247; 264/273; 264/326
[58] Field of Search ............... 264/326, 273, 249, 245, 264/246, 247; 301/5 R, 5.3, 13 R, 63 PW, 37 R

[56] References Cited

U.S. PATENT DOCUMENTS

| | | | |
|---|---|---|---|
| 1,914,487 | 6/1933 | Carter | 264/273 |
| 3,398,222 | 8/1968 | Kaufman et al. | 264/273 |
| 3,578,812 | 5/1971 | Taussig | 301/63 |
| 3,807,474 | 4/1974 | Wendt et al. | 301/63 PW |
| 4,095,846 | 6/1978 | Agins | 301/63 PW |
| 4,153,303 | 5/1979 | Tanner | 301/63 PW |

FOREIGN PATENT DOCUMENTS

| | | | |
|---|---|---|---|
| 2414411 | 9/1979 | France | 301/63 PW |
| 1177294 | 1/1970 | United Kingdom . | |
| 1260853 | 1/1972 | United Kingdom . | |
| 1301652 | 1/1973 | United Kingdom . | |
| 1315160 | 4/1973 | United Kingdom | 301/63 PW |
| 1567815 | 5/1980 | United Kingdom . | |

*Primary Examiner*—Willard E. Hoag
*Attorney, Agent, or Firm*—Cesari and McKenna

[57] ABSTRACT

Method for making a wheel composed of a rigid plastic inner section forming the wheel hub and rim and a resilient plastic tire section encircling the rim. A key formed integrally with the rim extends radially outward therefrom and interlockingly projects into the tire so as to mechanically connect the tire to the rim all around the wheel. The key can be formed with axially extending portions spaced radially outboard of the rim and terminating flush with the outer surface of the tire section so as to provide colored side wall decorations at one or both sides of the wheel. A method of molding the tire directly onto the discoid section is also disclosed.

7 Claims, 9 Drawing Figures

METHOD FOR MAKING A WHEEL WITH AN INTEGRAL TIRE

This invention relates to a wheel for use particularly on juvenile furniture. It relates more particularly to an improved molded plastic wheel and method of making same.

BACKGROUND OF THE INVENTION

Articles of juvenile furniture such as strollers, carriages, baby walkers and the like are customarily provided with wheels whose rims and hubs are made of metal or rigid plastic. A solid rubber tire encircles the rim so that the wheel as a whole has some "give" or resilience as it rolls over the ground. A metal rim wheel such as this is effectively expensive to make because the rim must be connected in some fashion to the wheel hub. This is most commonly accomplished by means of spokes or radial ribs. In another equally expensive wheel construction of which we are aware, the wheel is composed of two circular shells each defining one-half of the rim and one-half of the hub. The two shells are secured together edge to edge to form the wheel. In both of these constructions, the tire must then be mounted on the rim to form the finished wheel.

Molded plastic wheels are also quite commonplace. In this type of wheel, the hub, spokes and rim are all molded as one piece and the periphery of the wheel is embossed to simulate a tire. The use of this type of wheel is generally confined to very inexpensive strollers, doll carriages and the like because the wheel is not at all resilient and therefore gives a bumpy ride. Also, being a unitary molded plastic part, the entire wheel including the simulated tire is composed of the same colored plastic material. Therefore, the prospective purchaser of the stroller or carriage perceives that wheel to be inferior to one that carries a discernible resilient tire.

In addition, from a marketing standpoint, it would be desirable to provide a wheel for strollers and carriages which can be provided with a decorative side stripe similar to the sidewall stripe on an automobile tire. Until now, the only way this could be done is by painting the circular stripe on the sides of the wheel tire just outboard of the rim. However, such an operation adds appreciably to the overall cost of the wheel. Furthermore, in normal use of the vehicle, the wheel stripes become scraped and worn so that they no longer present an attractive appearance.

SUMMARY OF THE INVENTION

Accordingly, it is an object of the present invention to provide an improved wheel for use particularly on strollers, carriages and other similar items.

Another object of the invention is to provide a wheel such as this which is made entirely of plastic.

A further object is to provide such a wheel which is formed so that it has a clearly discernible resilient peripheral tire.

Yet another object of the invention is to provide a plastic wheel with integral decorative side wall stripes.

A further object of the invention is to provide a plastic wheel such as this which is relatively easy and inexpensive to make.

Still another object of the invention is to provide a method of making a plastic wheel having one or more of the above characteristics and advantages.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, the present wheel is formed entirely of plastic. It comprises an integrally formed spoked discoid rim and hub section molded of rigid plastic material in a first molding step. Then in a second molding step, a tire section is molded directly onto the rim section. The tire section material is a resilient plastic which is preferably colored black just like a conventional rubber tire.

During the second molding step, the wheel rim actually forms a part of the tire mold and the rim is provided with a peripheral key so that when the plastic tire material sets, the material interlocks with the key with the result that the tire is positively mechanically connected to the rim all around the circumference of the wheel.

In a preferred embodiment of the invention, the rim section of the wheel is also formed with flanges spaced outboard of the wheel rim and inboard of the key. The flanges are more or less parallel to the rim and may be present at one or both sides of the wheel. The lateral extent of those flanges is such that when the rim section is placed in the tire mole in preparation for the tire molding step, the edges of those flanges engage the sides of the tire mold.

When the plastic tire material is injected into the mold, it is free to flow all around those flanges on opposite sides thereof but not around the edges of the flanges. Resultantly, when the wheel is removed from the tire mold, the flange edges which engage the tire mold lie flush with the tire surfaces at the sides of the tire.

Thus, assuming that the wheel rim and tire sections are made of different colored plastic materials, the flange edges appear as distinct circular stripes at the sides of the tire resembling the sidewall stripes found on conventional automobile tires. Furthermore, these stripes are built right into the wheel so that they cannot be scraped or abraded away.

Using the present technique, then, one can fabricate a wheel which is made entirely of plastic. Yet the rim and tire sections can be composed of plastic materials which have different colors and physical characteristics. Accordingly, the resultant plastic wheel looks and funtions just like a conventional rubber tire wheel. By appropriately designing the wheel rim section as will be discussed in more detail later, one can obtain a variety of decorative effects on the wheel. These include single and multiple side wall stripes which may be continuous, interrupted or a combination of both. Yet with all of these advantages, the cost of making the subject wheel is less than that of prior conventional wheels having discernible resilient tires.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
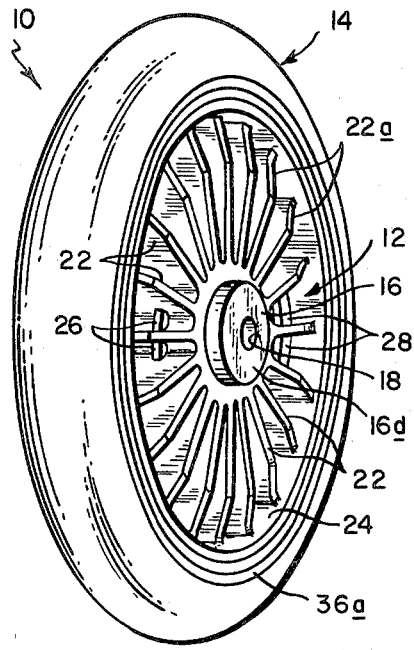
FIG. 1 is a front perspective view of a wheel made in accordance with this invention.
Figure 2:
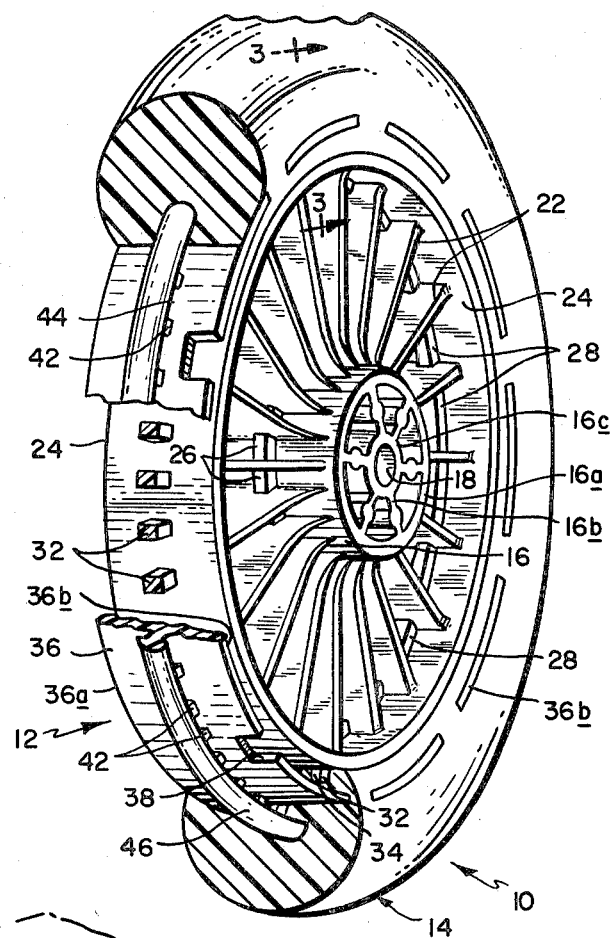
FIG. 2 is a rear perspective view of the wheel on a larger scale with parts broken away.

Referring to FIGS. 1 and 2 of the drawings, the wheel indicated generally at 10 comprises a discoid molded plastic rim section indicated generally at 12 and a molded generally toroidal plastic tire section shown generally at 14 mechanically connected to section 12. The rim section 12 which is composed of a rugged, impact-resistant plastic such as a polypropylene or high-density polyethylene is formed with a generally cylindrical hub 16. As best seen in FIG. 2, the hub includes a cylindrical outer wall 16a. Extending radially inward from wall 16a is a circumferential array of tabs or fins 16b which terminate at their inner ends at a cylindrical inner wall 16c. As shown in FIG. 1, an annular end wall 16d bridges the ends of the walls 16a and 16c to provide a finished appearance at the front of the wheel. The bore or passage 18 through wall 16c is arranged to rotatively receive the wheel axle when the wheel is mounted to a stroller or other juvenile furniture item.

Extending radially outward from hub 16 is a circular array of flat spokes 22. Spokes 22 terminate at their outer ends at a circular rim 24. At their outer ends, the spoke edges 22 at the finished front of the wheel are beveled inwardly as indicated at 22a in FIGS. 1 and 3 chiefly for ornamental reasons. An interrupted radial flange 26 projects out from hub wall 16a between the spokes 22 to rigidify the wheel. A second interrupted flange 28 projects radially inward from rim 24 for the same reason.

Figure 3:
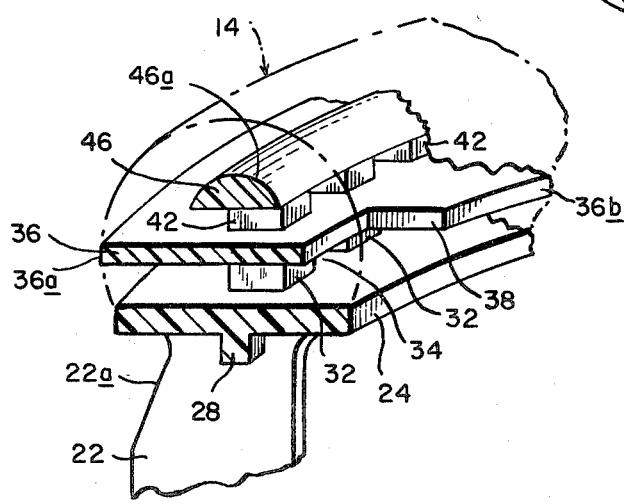
FIG. 3 is a sectional view along line 3—3 of FIG. 2 on a still larger scale showing parts of the wheel in greater detail.

Referring now to FIGS. 2 and 3, projecting radially out from the outer surface of rim 24 is a circular array of circumferentially spaced apart pedestals 32, each pedestal being separated from its neighbor by a gap 34. In the illustrated wheel, the outer ends of these pedestals 32 terminate in a flat circular ring 36 which is concentric with rim 24.

Projecting radially outward from the outer surface of ring 36 is a circular array of pedestals 42 which are separated by gaps 44. Pedestals 42 are essentially extensions of pedestals 32. The outer ends of pedestals 42 all terminate at a bead 46 which encircles ring 36. Bead 46 overhangs the sidewalls of pedestals 42 and its radially outer surface 46a is rounded. Thus the pedestals 42 and the bead 46 form an annular key radially outboard of the ring 36.

The wheel tire section 14 is molded directly onto the periphery of the wheel section as shown in FIGS. 2 and 3. Furthermore, the tire section is a solid mass of resilient plastic material such as thermoplastic polyurethane elastomer (65 Shore A durometer). It could just as well be a polyvinyl chloride elastomer. This material flows around and between the pedestals 32 and 42 and under the ring 36 and bead 46 so that all of these elements interlock with the tire section during its formation. Consequently, when the tire section material cures or sets, it is firmly mechanically anchored and interlocked with those components of the wheel section. Therefore, there is essentially no possibility of the tire section becoming separated from the rim section even after prolonged usage of the wheel.

As best seen in FIGS. 1 to 3, the ring edge 36a at the front of wheel 10 overhangs the corresponding edge of rim 24 and is continuous all around the wheel. The opposite ring edge 36b also overhangs the corresponding opposite edge of rim 24. However, the ring edge 36b is interrupted by rectangular notches or recesses 38 for reasons to be discussed later. The lateral or axial extent of the ring 36 is such that its opposite edges 36a and 36b are usually flush with the opposite side walls of tire section 14. Consequently, in the finished wheel, those edges appear as side wall stripes on the sides of the tire section at the front and rear faces of the wheel 10. The stripes are particularly prominent when, as is the usual case, the rim and tire sections 12 and 14 are composed of different colored plastic materials. For example, if the rim section 12 is formed of white plastic and the tire section 14 is colored black, then the ring edges 36a and 36b will appear as white sidewall stripes against the black tire on the finished wheel as shown in FIGS. 1 and 2.

Figure 4:
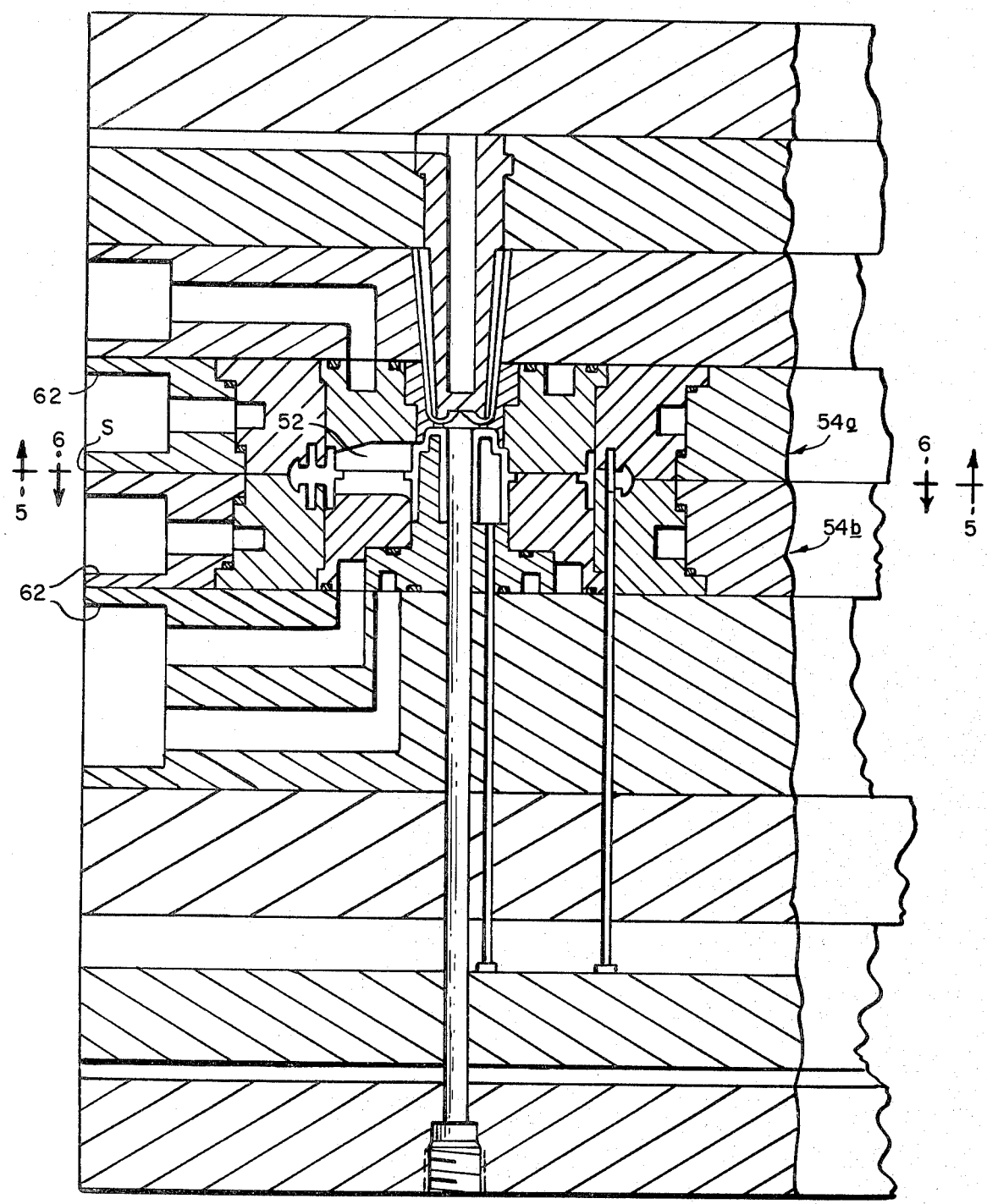
FIG. 4 is a fragmentary sectional view showing the die mold used to form the rim section of the FIG. 1 tire.
Figure 5:
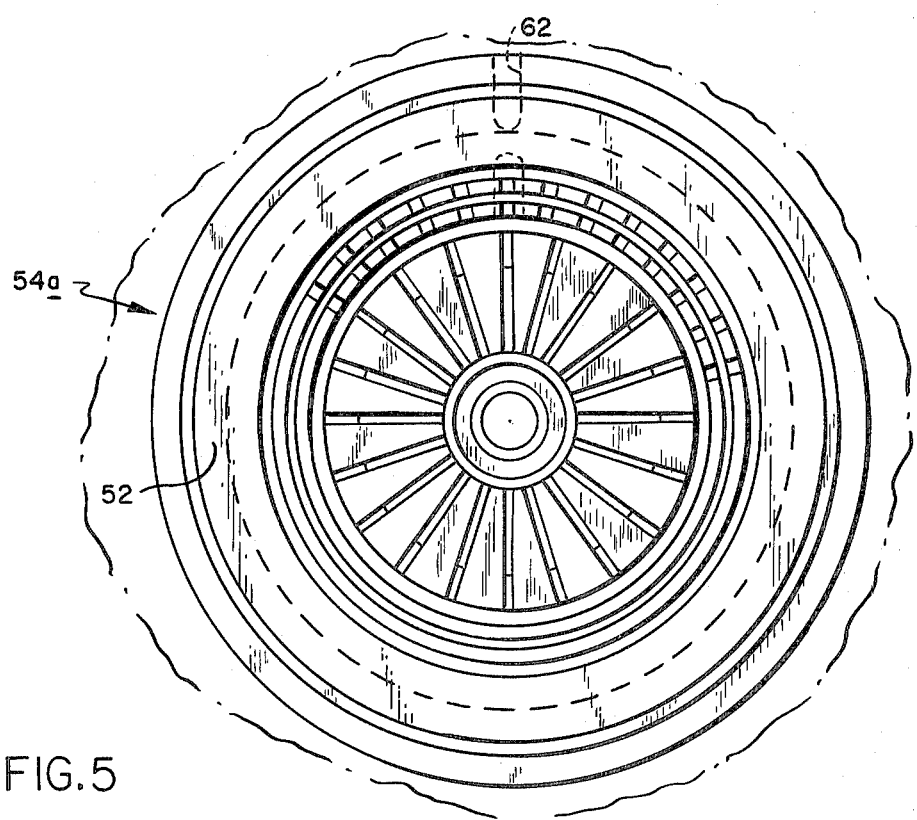
FIG. 5 is a fragmentary plan view along line 5—5 of FIG. 4 on a much larger scale.
Figure 6:
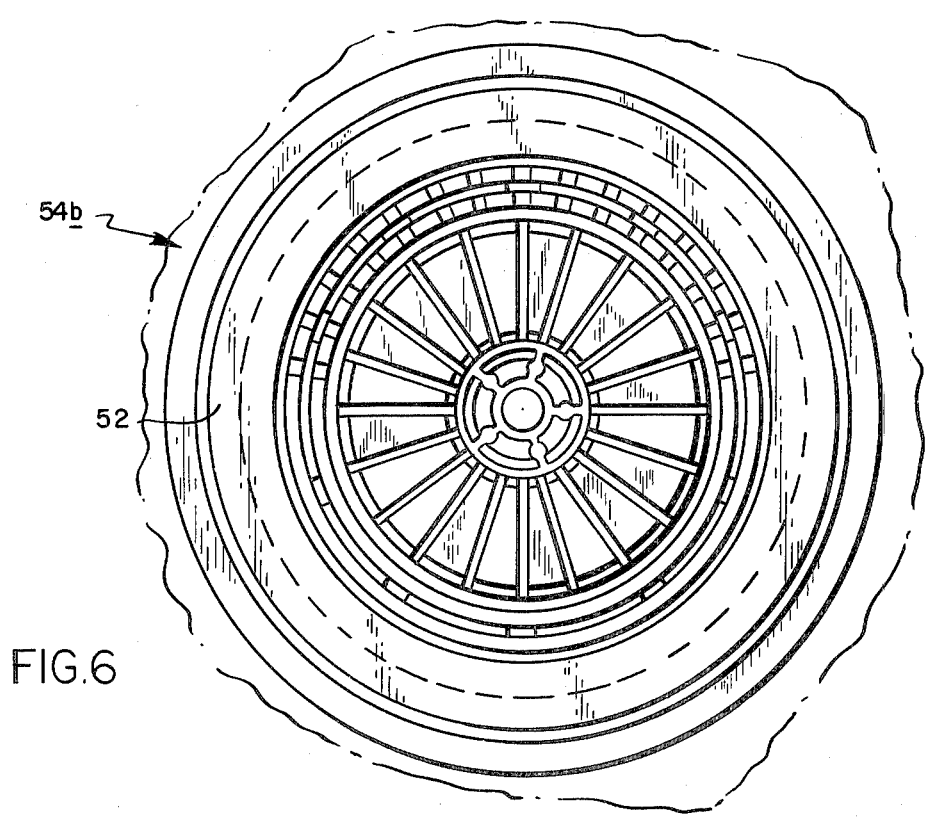
FIG. 6 is a similar view along line 6—6 of FIG. 4.

Referring now to FIGS. 4 to 6, the wheel rim section 12 is formed by more or less conventionally made custom die molds using standard injection molding techniques, the molds being illustrated in those figures. The wheel rim-forming mold cavity 52 is defined by mating upper and lower mold sections indicated generally at 54a and 54b which separate along line S in FIG. 4. Sections 54a and 54b are each composed of the usual stacked array of mold components which combine to form the upper and lower halves of the cavity 52 and provide the necessary plastic injection ports 62 for the cavity. Since the mold itself is not part of the invention, we will not describe it in detail. Suffice it to say that the mold cavity 52 formed by the two mold sections 54a and 54b is essentially a negative image of the wheel rim section 12.

During the molding process, the two sections are clamped together at line S and plastic material is introduced into cavity 52 through the various injection ports. After the plastic material has set, the mold sections are separated along the line S and the finished rim section 12 is removed from the mold. Actually, a single mold may have as many as four or more cavities 52 so that a plurality of rim sections 12 can be formed at the same time.

Figure 7:
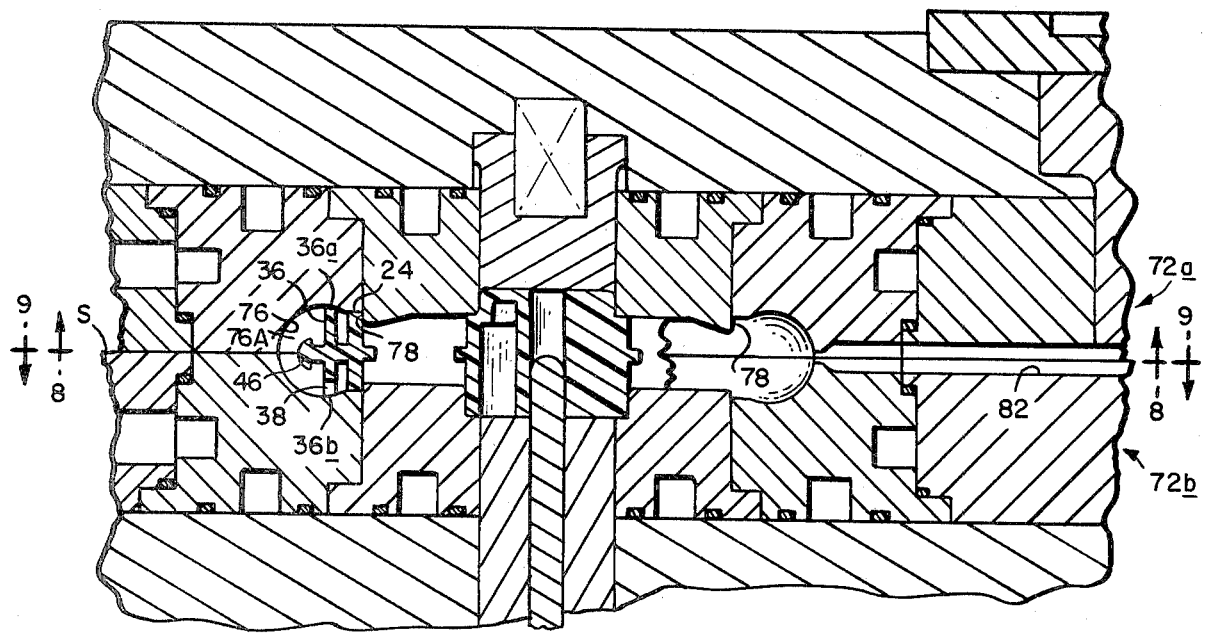
FIG. 7 is a sectional view similar to FIG. 4 of the die mold used to form the tire section of the FIG. 1. wheel and showing a rim section fragment seated in the mold.
Figure 8:
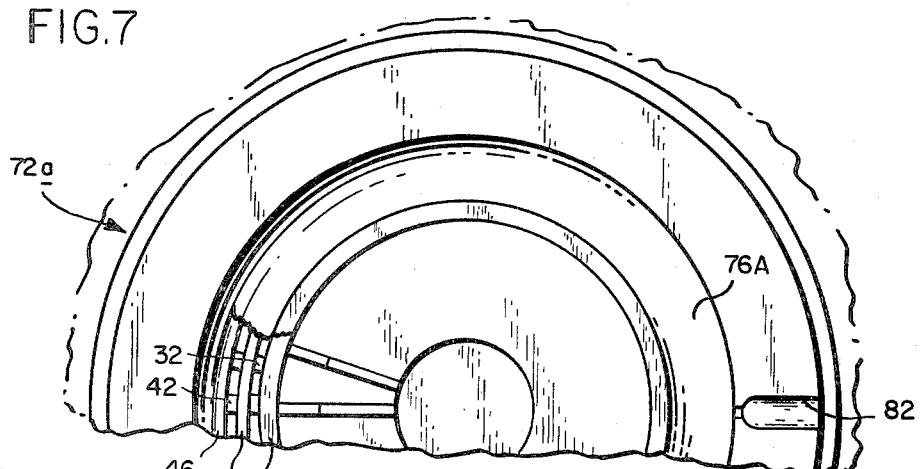
FIG. 8 is a fragmentary plan view along line 8—8 of FIG. 7 on a larger scale.
Figure 9:
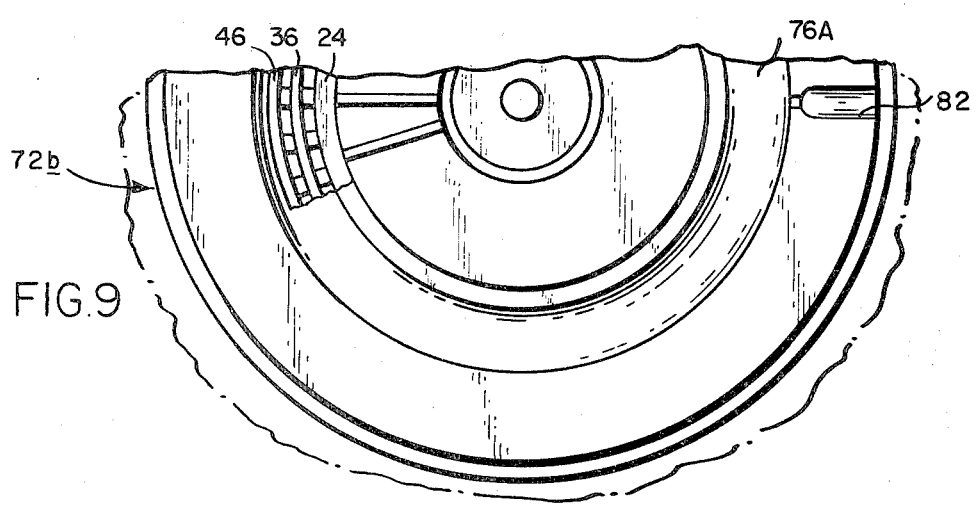
FIG. 9 is a similar view along line 9—9 of FIG. 7.

Refer now to FIGS. 7 to 9 which illustrate the mold for forming the tire section 14. The mold comprises mating upper and lower sections 72a and 72b which separate along the separation line S. The two sections together form a cavity 76. The mold sections are shaped to receive between them the wheel rim section 12 as illustrated in FIG. 7. When the two mold sections are clamped together, the opposite edges of wheel rim 24 are seated against the walls of the mold sections forming annular seals 78 as shown in FIG. 7. Also the opposite edges 36a and 36b of the ring 36 are themselves seated flush against the mold walls as shown in that same figure.

Plastic material is injected into the portion 76A of the cavity 76 radially outboard of rim 24 through an injection port 82 at the periphery of cavity 76. Portion 76A is essentially the negative image of tire section 14. One reason for the presence of the notches or recesses 38 in ring 36 should now become clear. Aside from providing a decorative effect at the tire section side wall, these notches permit the plastic material to flow into the annular gap between the rim 24 and the ring 36 so that the plastic tire molded onto the rim section is a solid plastic mass all the way from the rim 24 to the periphery of the tire section.

The introduction of the plastic material into that annular gap could also be provided by holes formed in the ring by an circular array of mandrils in the rim section mold. However, those mandrils would have to be retractable in order to permit the two mold sections 54a and 54b (FIG. 4) to be separated after the rim section is formed, necessitating a more complex and expensive mold.

When the tire section material has set, the finished wheel is removed from the mold. While there is a visible boundary between the tire section and rim section because of the different color plastic used to form the two sections, the two sections are mechanically linked together so it is virtually impossible to separate them without destroying them. The ring edges 36a and 36b appearing at the sides of the tire as decorative stripes are virtually indestructable since they extend right into the wheel. Abrasion of the stripes simply results in revealing the "fresh" like-colored stripe material.

By altering the edge portion of ring 36 by appropriately shaping the rim section mold cavity, one can create a variety of decorative effects on the side of the wheel, e.g. a circular array of dots, a wavy stripe, radially oriented stripes, etc. Likewise, another ring 36 may be added outboard of the first to form a wheel with concentric tire stripes.

On the other hand, if no stripes at all are desired, an insert can be placed in the rim section mold cavity to make ring 36 narrower so that it does not touch the tire mold during the formation of the tire section. In that event, the tire section plastic material is free to flow around the edges of the ring and thus conceals them.

Thus, forming a wheel out of two different plastic materials having different physical characteristics in a two-step molding process enables one to obtain at a relatively low cost a unitary plastic wheel having the "feel" and appearance of a conventional wheel fitted with a rubber tire. Therefore, the subject wheel can be incorporated into the more expensive strollers, carriages and other juvenile furniture items. Furthermore, the molding of the tire section of the wheel directly onto the rim section enables the wheel to be formed with a wide variety of decorative effects as discussed above.

It will thus be seen that the objects set forth above, among those made apparent from the preceding description, are efficiently attained, and, since certain changes may be made in carrying out the above method and in the article set forth without departing from the scope of the invention, it is intended that all matter contained in the above description and shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. The method of making a wheel comprising the steps of
    A. forming a rigid plastic wheel rim with an integral flange member spaced radially outward from the rim,
    B. placing the rim in a generally toroidal mold cavity with the rim forming a radially inner wall of the cavity,
    C. dimensioning the rim and cavity so that
        (1) the opposite edges of the rim engage the cavity wall forming seals therewith, and
        (2) engaging at least one side edge portion of the flange member with the cavity wall between radially inner and outer extents thereof, and
    D. filling the cavity with hardenable plastic material and hardening said material to form a tire which encircles and is mechanically connected to the rim by way of its flange member with said on side edge portion of the flange member forming a side wall decoration on said tire.

2. The method defined in claim 1 wherein the cavity is filled with a plastic material which cures or sets as a resilient elastomeric body.

3. The method defined in claim 1 and including the additional step of coloring the plastic material differently from the rim and flange member.

4. The method defined in claim 1 including the additional step of forming the flange member as a ring concentric to the rim with the opposite side edges of the ring engaging the opposite walls of the cavity so that side wall stripes are formed on both sides of the tire.

5. The method defined in claim 4 and including the additional step of forming at least one edge of the ring with recesses so that the resultant side wall decoration is interrupted around the tire.

6. The method defined in claim 4 wherein the forming step includes spacing the ring from the rim with a circular array of integral radial pedestals.

7. The method defined in claim 4 and including the additional step of forming the wheel rim with an integral keying projection encircling the ring so that when the cavity is filled with plastic material, the projection is imbedded in the resultant tire.

* * * * *